INVENTOR.
EMIL UMBRICHT

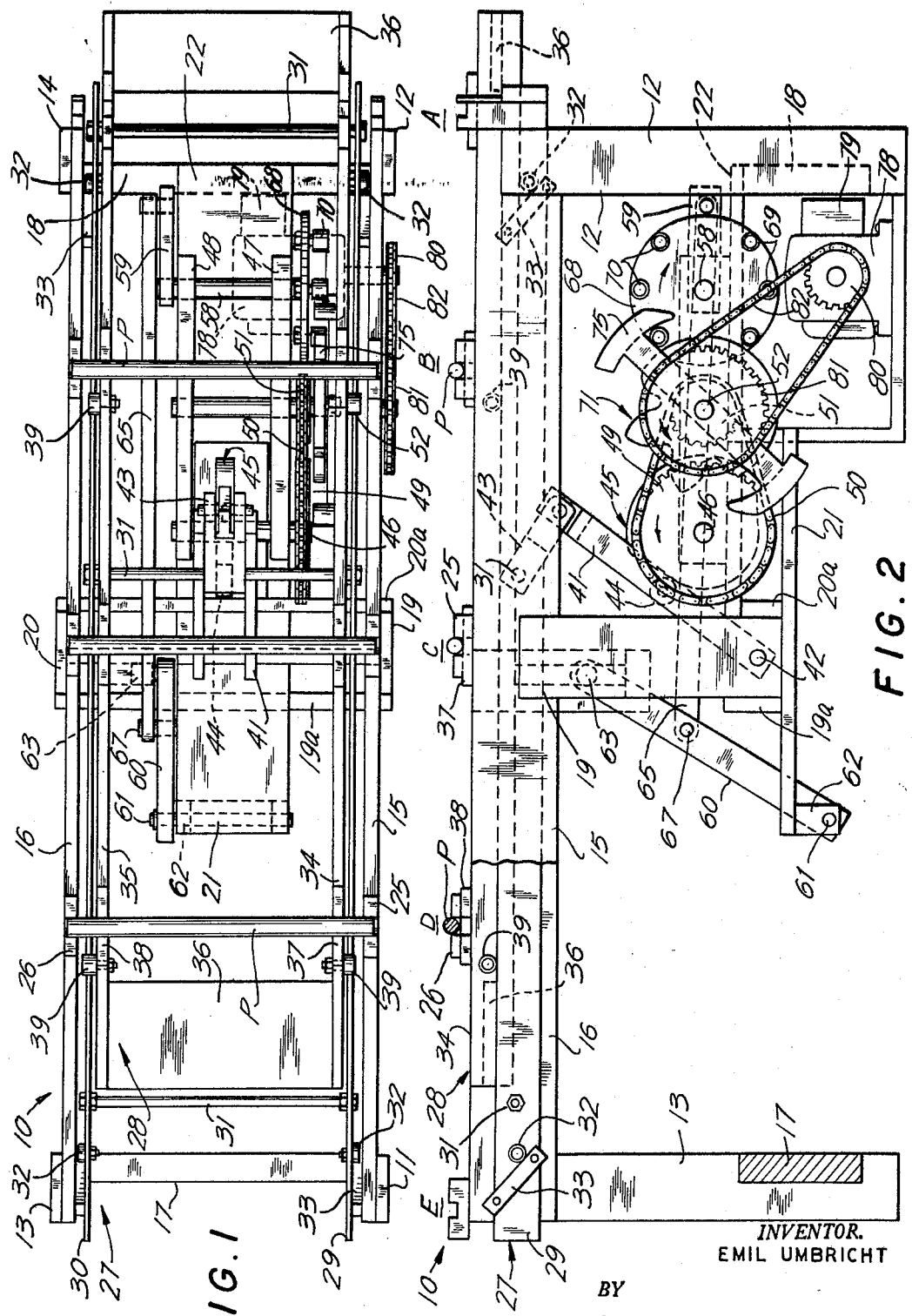

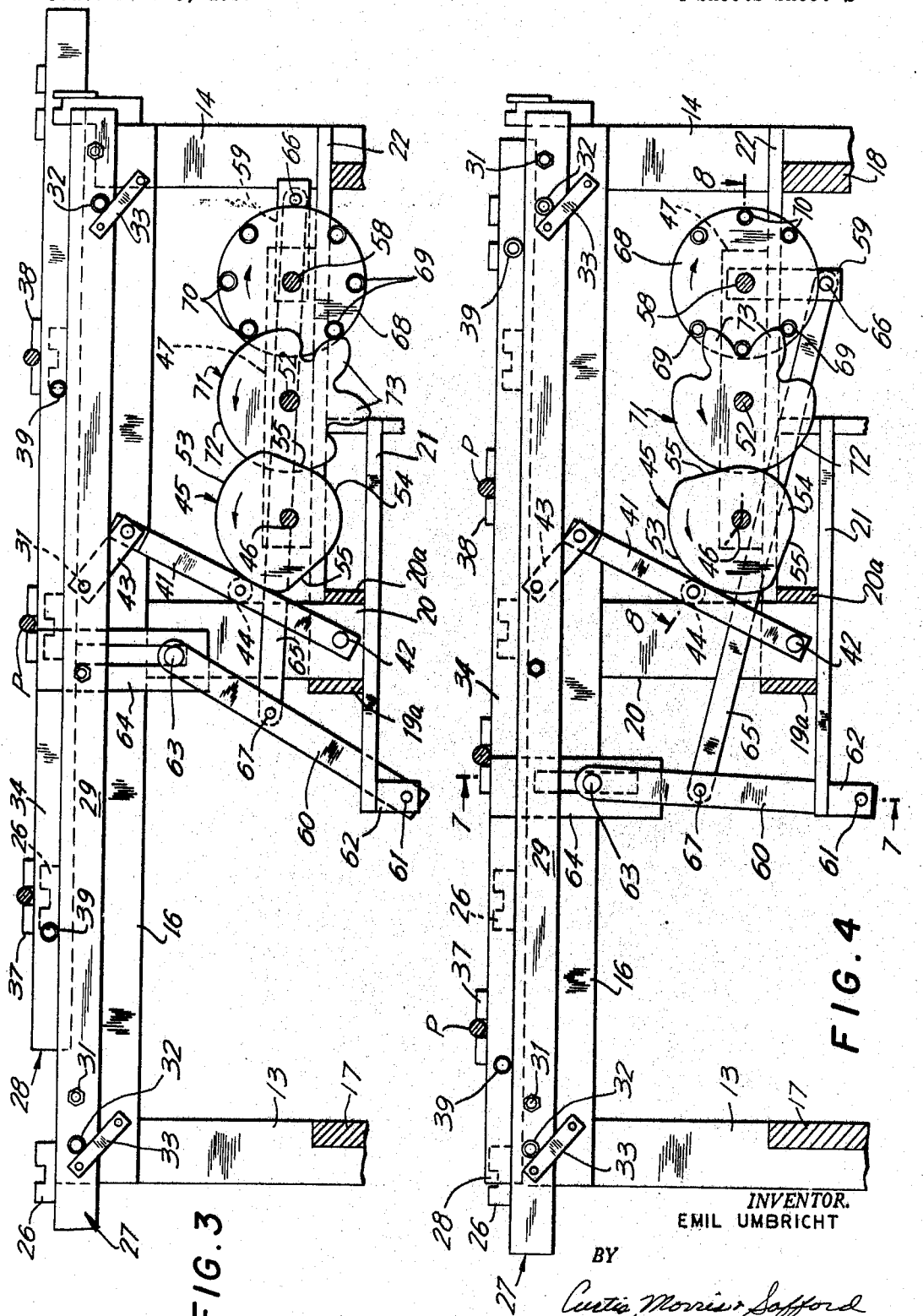

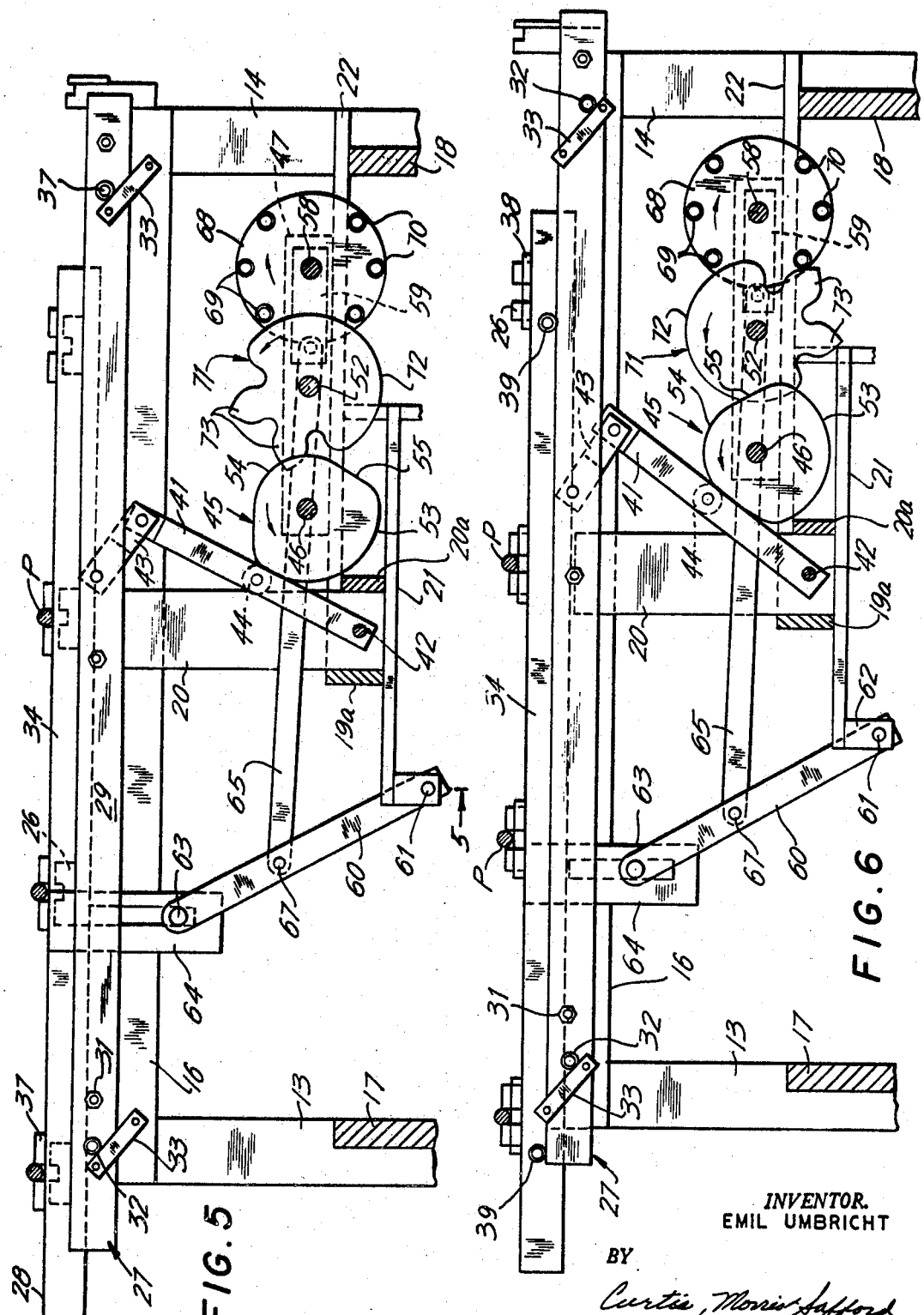

United States Patent Office 3,481,450
Patented Dec. 2, 1969

3,481,450
INDEXING MECHANISM
Emil Umbricht, Northville, Mich., assignor to Ajem Laboratories, Inc., Livonia, Mich.
Filed Feb. 8, 1968, Ser. No. 704,100
Int. Cl. B65g 25/04
U.S. Cl. 198—219                                11 Claims

ABSTRACT OF THE DISCLOSURE

Disclosure illustrates an indexing mechanism in the form of a walking beam for transferring parts to be treated to successive stations in which one driving mechanism raises and lowers a lifting frame and transfer frame mounted thereon during one complete cycle and a separate driving mechanism intermittently advances and retracts the transfer frame relative to the lift frame alternately with the raising and lowering of the latter.

---

The present invention relates to material handling apparatus and more particularly to an improved walking beam conveyor for intermittently advancing parts to successive stations where they may be machined or otherwise treated.

In accordance with the present-day practice in production line operations there is a trend to automate all such operations as far as possible. In such automated production lines the parts are automatically advanced from station to station where successive operations are automatically performed. For example, the parts may be treated at successive stations by subjecting them to washing, chemical treatment, and coating with a corrosion inhibitor. In all such operations, and especially where the parts have highly polished surfaces, it is necessary to handle and advance the parts so as to prevent damage to such surfaces.

It has heretofore been proposed to provide walking beam conveyors which lift parts from a seat or seats at one station, move the parts forwardly to the next station, and then lower the parts onto a seat or seats at the next station. Such walking beam conveyors usually operate satisfactorily for most purposes and have cams and cranks on a driving shaft for performing the lifting and advancing operations. As a result, there is a combined vertical and horizontal motion to the parts being advanced. Where precision is required, such a combined vertical and horizontal movement is apt to present difficulties in properly timing the movements and any wear or mal-adjustment may prevent accurate positioning of the parts at each station or even damage highly polished surfaces.

One of the objects of the present invention is to provide an improved walking beam conveyor which segregates the vertical lifting from the forward advance of a part to insure accurate movement of the parts in a predetermined fixed path.

Another object is to provide a walking beam conveyor of the type indicated which will insure a proper timing between the vertical and horizontal motions of the parts to at all times prevent forward motion of a part until it has been lifted off its seat and prevent lowering of a part onto its seat at the next station until its forward motion has been completed.

Another object is to provide an improved walking beam conveyor which permits a more gradual acceleration and deceleration of the parts as they are lifted and advanced to prevent uncontrolled movement thereof on the saddles.

Still another object is to provide an improved walking beam conveyor which is of relatively simple and compact construction, economical to manufacture, and one which is reliable in performing its intended functions.

These and other objects will become more apparent from the following description and drawings in which like reference characters denote like parts throughout the several views. It is to be expressly understood, however, that the drawings are for the purpose of illustration only and are not a definition of the limits of the invention, reference being had for this purpose to the appended claims.

In the drawings:

FIG. 1 is a plan view of an indexing mechanism incorporating the novel features of the present invention and showing the walking beam frames and actuating mechanism therefor;

FIG. 2 is a side elevational view of the indexing mechanism illustrated in FIG. 1 and showing the relationship of the separate cams of the actuating mechanism for raising and lowering the lifting frame and advancing and retracting the reciprocating transfer frame of the walking beam;

FIG. 3 is a view similar to FIG. 2 showing the relationship of the parts when the lifting frame has been actuated to lift parts from the seats on the stationary frame;

FIG. 4 is a view similar to FIGS. 2 and 3 showing the lifting frame held in raised position and the reciprocating transfer frame actuated by the separate cams;

FIG. 5 is a view similar to FIGS. 2 to 4 showing the dwell of one cam stopping the advance of the reciprocating transfer frame prior to operation of the other cam for lowering the frames to position the parts on seats of the frame at the next station;

FIG. 6 is a view similar to FIGS. 2 to 5 showing the relationship of the cams when the walking beam is lowered and prior to retracting the walking beam to its initial position;

Figure 7:
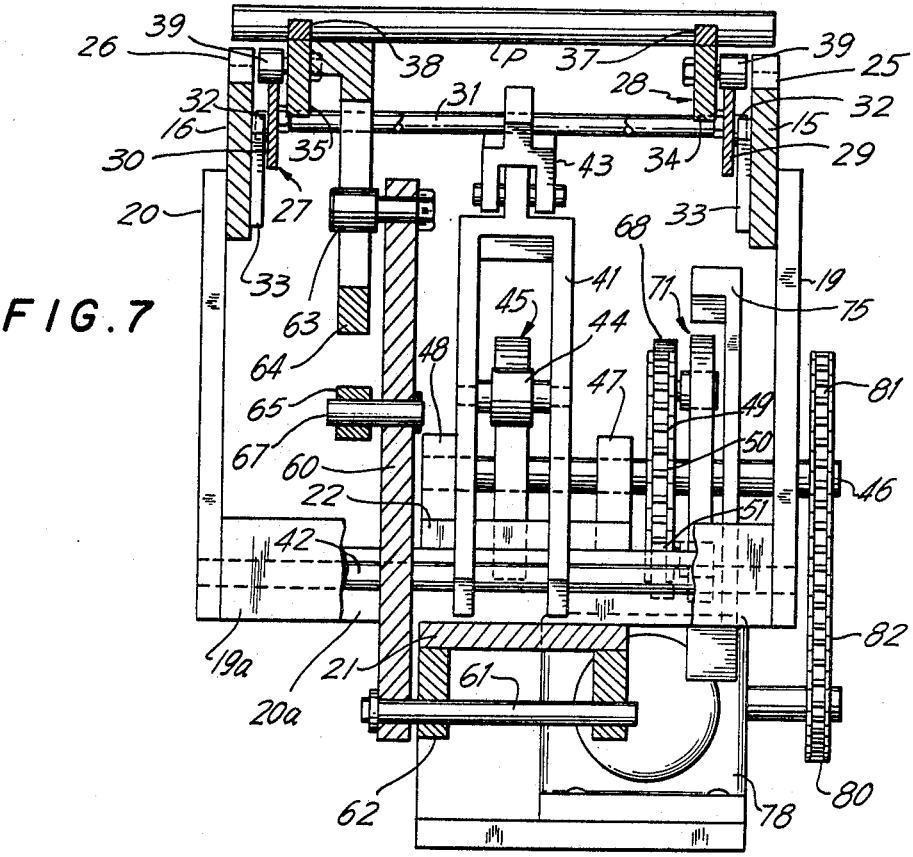
Figure 8:
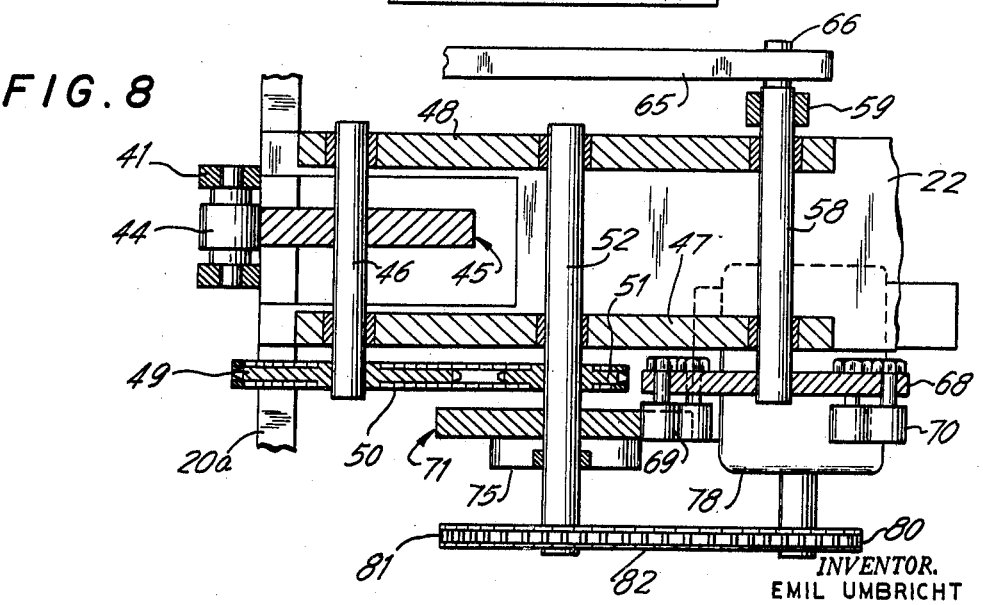

FIG. 7 is a transverse sectional view taken on line 7—7 of FIG. 4 to show the cam-operated follower arm for moving the walking beam along the ramps to raise it to the position illustrated in FIG. 4; and FIG. 8 is a sectional view taken generally on line 8—8 of FIG. 4 to show the connections between the common drive shaft and the first and second driven shafts for raising and advancing the lifting and transfer frames of the walking beam, respectively.

Referring now to FIGS. 1 and 2 of the drawings, the invention is shown applied to an indexing mechanism in the form of a walking beam conveyor comprising a generally rectangular frame 10 having legs 11, 12, 13 and 14 adjacent its corners with side plates 15 and 16 extending between the legs 11, 12 and 13, 14 respectively. The sides of the frame are tied to each other by cross-ties 17 and 18 between legs 11, 13 and 13, 14, respectively, and by members 19 and 20 depending from side plates 15 and 16 with transverse tie-bars 19a and 20a therebetween, which, together with cross-tie 18, support platforms 21 and 22.

The upper edges of the side plates 15 and 16 mount opposed pairs of seats 25 and 26 at successive stations A, B, C, D, and E for supporting the parts being processed. These seats 25 and 26 may take any form required for supporting a particular part to be treated, which, for purposes of illustration, is shown as a bar P. Bars P may be seated at successive stations A, B, C, D, and E on the frame 10 with the stations B, C, and D being those where the part would be worked on, as, for example, washed, chemically treated, and subjected to a corrosion inhibitor.

In accordance with the present invention, the walking beam is raised and lowered by one driving means and advanced and retracted by a separate driving means. The separate driving means, however, are so interconnected that the walking beam is raised to lift the parts from their seats before it can be advanced, the advance of the walking beam is stopped before it can be lowered, and the walking beam is lowered before it can be retracted.

To this end the walking beam conveyor comprises a relatively moving lifting frame 27 and reciprocating transfer frame 28 mounted one over the other and supported on the side plates 15 and 16 of the main frame 10. The lifting frame 27 comprises a pair of rails 29 and 30 held in spaced relation by cross-ties 31 in the form of rods. Rails 29 and 30 of the lifting frame 27 have rollers 32 projecting outwardly from their opposite sides which overlie inclined ramps 33 projecting inwardly from the side plates 15 and 16 of the main frame 10. Four such rollers 32 are shown adjacent each corner in opposed pairs as shown in FIG. 1; but it will be understood that a greater number of such rollers and ramps may be provided. Thus, by moving the lifting frame 27 horizontally from the position shown in FIG. 2 to the position shown in FIG. 3 the rollers 32 ride up the inclined ramps 33.

The reciprocating transfer frame 28 is of less width than the lifting frame 27 and also comprises a pair of rails 34 and 35 connected by spaced cross-struts 36. The spaced rails 34 and 35 of the transfer frame 28 have spaced seats or saddles 37 and 38 mounted on their upper edges which are like the saddles 25 and 26 on the main frame 10. When the transfer frame 28 is in the raising and lowering positions illustrated in FIGURES 2 and 5 the saddles 37 and 38 are in vertical alinement with the saddles 25 and 26. Transfer frame 28 has rollers 39 projecting outwardly and downwardly from their sides which overlie the rails 29 and 30 of the lifting frame on which they roll to bodily advance and retract the transfer frame. Thus, vertical movement of the lifting frame 27 upwardly lifts the transfer frame 28 with it to lift the parts P off the opposed pairs of seats 25 and 26 at the stations B, C and D after which the transfer frame is moved forwardly to advance the parts P to the next adjacent station.

The driving mechanism for operating the lifting frame comprises a bifurcated rocker arm 41, see FIGS. 2 and 7, mounted to rock on a pivot pin 42 at its lower end and having its upper end pivotally connected to one end of a link 43 between it and a cross-tie 31. The rocker arm 41 has a follower roller 44 intermediate its ends which bears against the edge of a peripheral cam 45 mounted on a shaft 46.

As shown in FIGS. 1 and 7, the shaft 46 is journaled in spaced walls 47 and 48 supported from the transverse platform 22 of the frame 10. A sprocket 49 on the shaft 46 is driven by a chain 50 from a sprocket 51 on a drive shaft 52 also journaled in spaced sidewalls 47 and 48. The ratio of driving sprocket 51 to the driven sprocket 45 has a one-to-two value so that two revolutions of the drive shaft 52 are required to complete one revolution of the cam 45.

As shown more clearly in FIGS. 3 and 4, the cam 45 has a lobe 53 and a dwell 54 each of which extends through an angle of less than 180° with flat surfaces 55 connecting the opposite sides of the lobe and dwell. Thus, when the cam 45 is rotated from the position shown in FIG. 2 to that shown in FIG. 3, it actuates the rocker arm 41 which, acting through the link 43, moves the lifting frame 27 so that its rollers 32 ride up the ramps 33 toward the left to raise the frame and transfer frame 28 mounted thereon. Cam 45 then retains the frames 27 and 28 in raised position for nearly one-half of one revolution of the cam and until the flat portion 55 of the cam between the lobe and dwell engages the follower roller 44 after which the frames descend vertically.

The driving mechanism for operating the transfer frame 28 comprises a shaft 58 journaled in the walls 47 and 48 at the sides of the platform 22 and having a crank 59 at one end. The crank 59 is connected through linkage to the transfer frame 28 as shown most clearly in FIGS. 1, 3 and 7. This linkage includes a rocker arm 60 pivotally connected at its lower end on a pivot pin 61 journaled in bearing blocks 62 dependent from the transverse platform 21, see FIG. 3, and having a pin 63 at its upper end projecting laterally into a slotted yoke 64 rod 65 connects the crank pin 66 of the crank 59 and a pin 67 on the rocker arm 60 intermediate its ends. Thus, when the shaft 58 is rotated clockwise as viewed in FIG. 3, it rotates the crank arm 59, and operating through the connecting rod 65, pivoted rocker arm 60 and slotted yoke 64, moves the transfer frame 28 forwardly, or toward the left, in the manner illustrated in FIG. 4.

The shaft 58 is driven intermittently by a Geneva gear mechanism, see FIG. 1. In the illustrated embodiment the Geneva gear mechanism comprises a disc 68 mounted fast on the other end of the shaft 58, see FIG. 1, and the disc has two separate sets of rollers 69 and 70 mounted on and projecting outwardly from the side thereof. Each set has three rollers and the set 69 are equally spaced on one side of the shaft 58 while the other set 70 are equally spaced on the other side of the shaft with a greater spacing between sets than between the rollers of each set. The rollers 69 and 70 are engaged and driven by a cam 71 having a dwell 72 extending through slightly more than 180° of its periphery and teeth 73 equally spaced around the remainder of its periphery. Teeth 73 project outwardly beyond the periphery of the dwell portion 72 so as to engage the sets of rollers 69 or 70. Cam 71 is mounted on the common drive shaft 52 mounting the sprocket 51 for driving the cam 45. As shown in FIGS. 3 and 4, the teeth 73 of the cam 71 engage the rollers of one of the sets 69 or 70 during a portion of a complete revolution of the drive shaft 52 and cause the successive rollers of the set to follow along the curved surfaces of the teeth and thereby rotate the disc 68 and shaft 58 on which it is mounted. After the teeth 73 on the cam 71 have engaged one set of rollers 69 or 70 and rotated the disc 68 for approximately 180°, the dwell portion 72 of the cam will then pass between the sets of rollers during the remainder of its 360° of rotation to complete one turn. Rotation of the shaft 58 from the position shown in FIG. 3 to that shown in FIG. 5 rotates crank 59 through 180° to advance the transfer frame through a complete forward stroke. By reference to FIGS. 1 and 2 it will be observed that a cooperating cam surface 75 is provided in spaced relation to the outer periphery of the cam 71 to direct the rollers of each set 69 or 70 into engagement with the projecting end of the teeth 73 to insure rotation of the disc 68 through one-half of a revolution for each complete revolution of the cam 71.

By reference to FIGS. 1 and 2 it will be seen that the common drive shaft 52 is driven from a motor 78 having a reduction gear 79. The shaft of motor 78 and drive shaft 52 have sprockets 80 and 81 connected by a chain 82. With the arrangement described, the shaft 46 is continuously driven from drive shaft 52 by chain 50 and the gearing ratio is such that two complete revolutions of the shaft 52 are required to complete one revolution of the driven shaft 46. Driven shaft 58, on the other hand, is intermittently driven through one-half a revolution during each revolution of the drive shaft 52 so that two complete revolutions of the drive shaft are required to make one complete revolution of the driven shaft. However, it will be noted that the arrangement of the driven cams 45 and 71 is such that the lobe 53 of cam 54 operates to lift the frames 27 and 28 while the dwell portion 72 of cam 71 idles with respect to the sets of rollers 69 and 70 for advancing the transfer frame 28 and that the lobe 53 and dwell 54 of cam 45 hold the frame in their raised or lowered position while the cam 71 is operative to advance or retract the transfer frame. One form of the invention now having been described in detail, the mode of operation is next explained.

For purposes of description, let it be assumed that the parts are initially in the position illustrated in FIGS. 1 and 2 and that parts P being treated are seated on the opposed pairs of seats 25 and 26 at the stations B, C and D. When the treatment of the parts P at the particular stations is completed, operation of the indexing mechanism is initiated, either manually or automatically, by suitable timing mechanism. Motor 78 operates through the sprocket 80, chain 82 and sprocket 81 to drive the common drive shaft 52 counterclockwise as viewed in FIG. 2. It will be understood, however, that the shaft 52 may be driven in either direction by merely changing the position of cam 45 on shaft 46. Drive shaft 52, operating through the chain 50 and sprocket 49, rotates driven shaft 46 counterclockwise from the position shown in FIG. 2 to that shown in FIG. 3, or, in other words, rotates the flat surface 55 between the dwell 54 and lobe 53 of the cam relative to the cam follower 44 to pivot the rocker arm 41 toward the left. Such rocking movement of the rocker 41 operating through the link 43 moves lifting frame 27 toward the left so that rollers 32 roll up the inclined ramps 33 on the fixed frame 10 from the position shown in FIG. 2 to that shown in FIG. 3 and raise the frame to a higher level. The forward movement of the lifting frame 27 is relative to the reciprocating transfer frame 28 which is held in its retracted position by its connection with the crank arm 59 on the driven shaft 58. However, the lifting movement of the frame 27 also lifts the reciprocating transfer frame 28 mounted thereon which rises vertically so that its pairs of seats 37 and 38 lift the parts P off the seats 25 and 26 at the stations B, C and D.

During rotation of the driven shaft 46 to advance the lifting frame 27, the dwell 72 of cam 71 has been moving relative to the disc 68. However, after the frames 27 and 28 together with the parts P have been raised, the cam 71 will have rotated to a position where the first tooth 73 will engage the first roller of the set 69 as shown in FIG. 3 and rotate the disc in the manner shown in FIGS. 3 and 4. Such rotation of the disc 68 and shaft 58 rotates the crank arm 59 and, acting through the connecting rod 65, rocker arm 60 and slotted yoke 64, advances the transfer frame from the position shown in FIG. 3 to that shown in FIG. 5. During this period of time, the lobe 53 of the cam 45 will have held both frames 27 and 28 elevated so that the parts clear the seats 25 and 26 as they are advanced. Prior to completion of one revolution of the driven shaft 58 the teeth 73 of cam 71 will have disengaged the rollers of set 69 and the dwell 72 will have moved into the space between adjacent sets of rollers 69 and 70 which stops rotation of shaft 58 and advance of transfer frame 28.

Upon completion of one complete revolution of the common drive shaft form the position shown in FIG. 2 to that shown in FIG. 5, cam 5 will have turned to a position where the opposite flat portion 55 connecting the lobe 5 and dwell 54 is about to engage the follower 44 on rocker arm 41, and the dwell 72 of the cam 71 will be positioned between the groups of rollers 69 and 70, see FIG. 5. As cam 45 rotates from the position shown in FIG. 3 it releases the frame 27 which then rides down the ramps 33 to the position shown in FIG. 6. Such movement of frame 27 lowers the transfer frame 28 vertically to position the parts P on the seats 25 and 26 at the next adjacent stations C, D and E.

During the remainder of the second rotation of the common drive shaft 52 the follower 44 on rocker arm 41 will remain on the dwell 54 of the cam 45, but the teeth 73 of the cam 71 will engage the next group of rollers 70 to rotate the disc 68 and driven shaft 58 and rotate crank 59 back to its initial position illustrated in FIG. 2. During this return movement, crank 59 operating through the connecting rod 65, rocker arm 60 and slotted yoke 64 will retract the transfer frame 28 to its initial position relative to the lifting frame 27.

Thus, the walking beam conveyor operates to advance parts P through successive stations A, B, C, D and E by separate operating mechanisms that drive the lifting and transfer frames 27 and 28 independently of each other to insure accurate placement of the parts. Further, the independent drives for the frames 27 and 28 of the present invention permits a gradual acceleration and deceleration of the parts both vertically and horizontally during the transfer.

It will now be observed that the present invention provides an improved walking beam conveyor which segregates the vertical lifting from the forward advance of a part to insure accurate movement of the parts in a predetermined fixed path. Also, it will be observed that the present invention insures a proper timing between the vertical and horizontal motions of the parts to prevent any forward motion of a part until it has been elevated and prevent lowering of a part until its forward motion has been completed. It will further be observed that the present invention provides an improved walking beam conveyor which permits a more gradual acceleration and deceleration of the parts as they are transferred from one station to another. It will still further be observed that the present invention provides an improved walking beam conveyor of simple and compact construction which is adapted for economical manufacture and one which may be relied upon to perform its intended functions.

While a single embodiment of the invention is herein illustrated and described, it will be understood that changes may be made in the construction and arrangement of elements without departing from the spirit or scope of the invention.

What is claimed is:

1. In an indexing mechanism of the type having a fixed support with spaced saddles for mounting parts and a walking beam mounted for upward movement to lift at least one part off the saddles on the fixed support and for horizontal movement to advance the lifted part from one station to an adjacent station, the combination with said elements of means including a first shaft for maintaining said walking beam in a raised position during its first half revolution and maintaining it in a lowered position during its second revolution, separate means having a second shaft for advancing and retracting the walking beam, a common drive shaft, a continuous driving connection between the drive shaft and first shaft, and an intermittent driving connection between the common drive shaft and second mentioned shaft to delay the advance and retraction of the walking beam until the latter has been raised and lowered by the first mentioned means, respectively.

2. An indexing mechanism having a fixed support with spaced saddles for supporting parts, a walking beam, means including a first driven shaft having a cam for raising and lowering the walking beam, means including a second driven shaft for advancing and retracting the walking beam, a common drive shaft connected to drive the first mentioned shaft for raising and lowering the walking beam, and an intermittently operating driving mechanism between said common drive shaft and said second driven shaft for starting and stopping operation of said second shaft to advance the walking beam only after it has been raised and retract the walking beam only after it has been lowered.

3. An indexing mechanism in accordance with claim 2 in which the means for raising and lowering the walking beam is a cam on the first shaft having a lobe for maintaining the walking beam raised during a substantial portion of its first half revolution and a dwell for maintaining the walking beam lowered during a substantial portion of a second half revolution of said shaft.

4. An indexing mechanism in accordance with claim 2 in which the driving mechanism for intermittently starting and stopping the operation of the second shaft is a Geneva gear.

5. An indexing mechanism in accordance with claim 2 in which a sprocket is mounted on the first driven shaft, a disc mounted on the second driven shaft and having separate sets of spaced rollers projecting therefrom, the common drive shaft having a pinion gear and a cam mounted thereon, said cam having radially projecting teeth with a dwell between the teeth, a chain connecting the pinion gear on the drive shaft with the sprocket on the first shaft, and said teeth projecting from the cam on the common drive shaft meshing with the sets of spaced rollers on the second shaft successively, to operate the latter intermittently.

6. An indexing mechanism in accordance with claim 2 in which the walking beam comprises a lifting frame and a transfer frame, said transfer frame being mounted on and movable along said lifting frame and having saddles alined vertically with the saddles on the main frame, and said driving mechanism between said common drive shaft and said second driven shaft holding the transfer frame against forward or rearward movement while it is being raised and lowered by the lifting frame whereby to lift and lower the parts being treated vertically from the saddles on the main frame.

7. An indexing mechanism in accordance with claim 2 in which the fixed support has inclined ramps on opposite sides, said walking beam comprising a lifting frame and a transfer frame mounted on and movable relative to the lifting frame, said lifting frame having supports bearing on said inclined ramps for raising and lowering said frame as it is moved forwardly and rearwardly relative to the inclined ramps, and said means for raising and lowering said walking beam comprising a cam on the first shaft and connected to advance the lifting frame relative to the inclined ramps to raise it and the transfer frame mounted thereon.

8. An indexing mechanism in accordance with claim 7 in which the means for advancing the lifting frame is a rocker arm pivotally connected at its opposite end to the fixed support and frame and having a follower intermediate its ends engaging the cam.

9. An indexing mechanism in accordance with claim 7 in which said lifting frame comprises spaced tracks and said transfer frame having rollers engaging said spaced tracks for mounting it for movement longitudinally of said tracks of the lifting frame.

10. An indexing mechanism in accordance with claim 9 in which the means for advancing and retracting the transfer frame is a crank on the second shaft and a connecting rod between the crank arm and the transfer frame.

11. An indexing mechanism in accordance with claim 10 in which the means for advancing and retracting the transfer frame comprises a rocker arm pivotally connected at one end to the fixed support and having a pin at its opposite end, a yoke dependent from the transfer frame and having a vertical slot therein into which the driving pin projects, and the connecting rod connecting the crank arm on the second shaft to the rocker arm.

References Cited
UNITED STATES PATENTS

| | | | |
|---|---|---|---|
| 3,187,883 | 6/1965 | Umbricht | 198—219 |
| 3,215,360 | 11/1965 | Umbricht et al. | 198—219 |

ROBERT G. SHERIDAN, Primary Examiner